Figure 1:
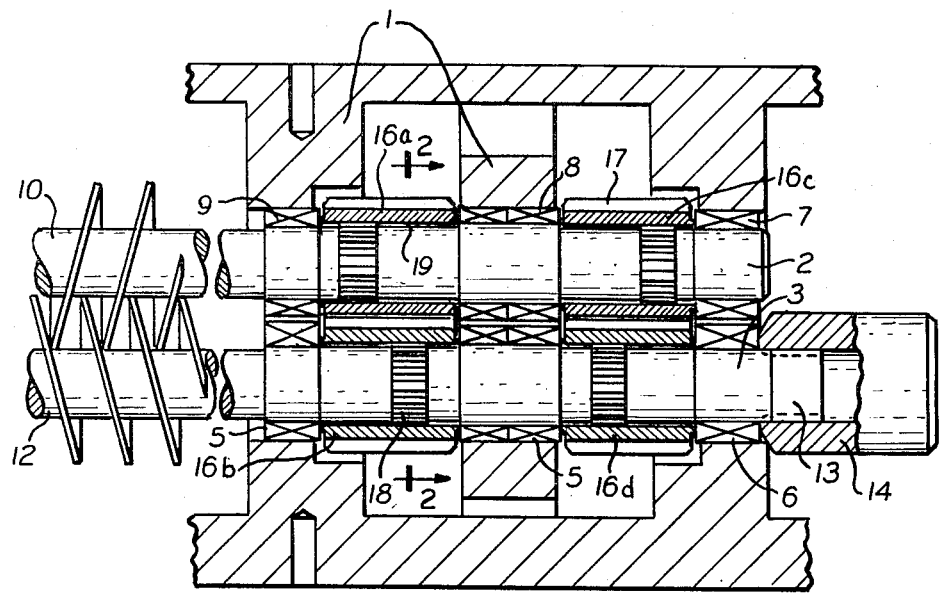

United States Patent [19]
Bacher et al.

[11] 3,805,633
[45] Apr. 23, 1974

[54] TWIN SCREW EXTRUDER SHAFTS, EACH DRIVEN BY MULTIPLE GEAR SETS, EACH WITH OFFSET PARTIAL SPLINES

[75] Inventors: Helmut Bacher; Georg Wendelin, both of Bavaria, Germany

[73] Assignee: Krauss-Maffei A.G., Munich, Germany

[22] Filed: Mar. 14, 1972

[21] Appl. No.: 234,524

[30] Foreign Application Priority Data
Mar. 16, 1971 Germany.......................... 2112658

[52] U.S. Cl................................. 74/410, 74/411
[51] Int. Cl................................. F16h 1/10, F16h 1/08
[58] Field of Search..... 222/413; 198/213; 418/201; 74/412, 413, 414, 415, 410, 411, 427

[56] References Cited
UNITED STATES PATENTS
| | | | |
|---|---|---|---|
| 2,466,888 | 4/1949 | Garraway | 74/410 |
| 1,228,493 | 6/1917 | Smith | 74/410 |
| 1,968,604 | 7/1934 | Hertz | 74/410 |
| 2,027,592 | 1/1936 | Hoffman | 74/410 |
| 3,289,488 | 12/1966 | Breuer | 74/410 |
| 3,174,352 | 9/1962 | Jekat | 74/410 |

OTHER PUBLICATIONS
Design of Machine Elements by Virgil M. Faires, 4th edition, 1965 Copyright, Macmillian Co., page 367.

Primary Examiner—Samuel Scott
Assistant Examiner—Allan Russell Burke
Attorney, Agent, or Firm—Theodore Hafner

[57] ABSTRACT

The invention relates to a driving arrangement for extruder screws in which a motor driven shaft drives at least one other parallel shaft in opposite direction through at least two pairs of gears separately mounted on the shafts so as to distribute the strain caused by the transfer of power from one shaft to the other over the several gears mounted on each shaft.

8 Claims, 2 Drawing Figures

TWIN SCREW EXTRUDER SHAFTS, EACH DRIVEN BY MULTIPLE GEAR SETS, EACH WITH OFFSET PARTIAL SPLINES

One of the objects of the invention is to prevent the individual gears on each shaft from being overloaded and at the same time to replace the relatively wide gears used hitherto in single pairs with several pairs of shorter gears mounted separately, which can be more economically and more accurately manufactured and installed and, in case of replacement or repair, more easily handled than a single pair of relatively wide gears.

A further object of the invention is to provide for the several pairs of gears separate bearings to facilitate replacement, but also to permit each individual pair to work relatively independently, thus causing the transfer of any strain from one pair to the other, not directly and immediately but through the intermediary of mechanical elements separating these gear pairs.

In a further embodiment of the invention, the separate mounting of each of these gear pairs includes a specific coupling between the outer surface of the shaft and the inner surface of the gear mounted thereon, consisting of surface elements connected with each other secure against rotation, or "turn-safe," over a portion of the shaft which is substantially smaller than the width of the inner gear surface mounted thereon; and in a modification of this embodiment, this inner gear surface is mounted on the shaft additionally, at least at both ends of this inner gear surface.

In another modification, the interconnected coupling surfaces of shaft and gear interlock, extending in directions substantially perpendicular to the periphery of the shaft, preferably in the form of teeth arranged along the inner surface of the gear substantially parallel to its axis and over its entire length, so as to permit the gear to be mounted and dismounted from the shaft by simply sliding the gear over the corresponding interlocking elements or teeth, projecting from the shaft over a distance substantially shorter than that of the inner surface of the gear.

In accordance with the principle set forth, the invention generally involves the distribution of power transferred from one shaft to another over a number of driving elements, thereby reducing the load per element, but at the same time, in case of accidental or operational overloads as they occur, for example, in the operation of extruder screws, limiting any damage to a limited section of the driving mechanism, for example to one gear only or only to a portion of the gear, for example turn-safe, interconnected or interlocking coupling surfaces, thus permitting repair or replacement and resumption of operation in a minimum of time and at a minimum of cost.

This distribution of load over specific portions of the driving mechanism and more particularly the distribution even within one gear from the entire body of the gear to merely that portion forming the limited but turn-safe interlock is considered an embodiment of the invention, applicable not only to a number of gears, whether arranged in parallel or in series, but also to single gears and generally in any driving mechanism, without exceeding the scope of the invention.

Here again, the limited, turn-safe connection between the driving gear and its shaft may be such that the gear will not only be seated on its turn-safe connection but also, at least with its ends, directly on the shaft. The gear, f.e., may be in the form of a tubing having outer teeth meshing with other gears, and inner teeth, forming part of the turn-safe connection, which is slid over an appropriately toothed shaft piece.

A specific advantage of this arrangement is in its simple manufacture, not requiring elastic intermediaries. The tooth flanks of the gear, in spite of production-conditioned inaccuracies and torsional distortion of the shaft caused by excessive torque, are elastic with respect to the engaging gear.

This is of particular advantage in the interconnection of the two driving shafts of a twin-screw extruder through two or more pairs of driving gears. For this case a large angular torque is injected into one of the shafts and transferred therefrom directly to one of the screws. At large loads, it has been found difficult, if not impossible, with the usual driving gear arrangement, to support the teeth of the gear pairs equally and to distribute the stresses due to the torque equally over the gear pairs. Groove formation as well as tooth breakage could not be avoided.

Transfer of large power to extruders, however, by the simple two-shaft drive becomes possible in accordance with the invention, if the power transfer between the shafts driving the extruder screws occurs at least through two pairs of driving gears with helical teeth, each driving gear being connected with its shaft through limited turn-safe connections in accordance with the invention. In this case, the elastic adaptation of the driving gears to the torsional distortions of the shafts caused by the peculiar loads impressed on the shafts becomes particularly effective if the turn-safe connections of the gears on each driving shaft are mirror-symmetrically displaced with respect to each other. It is also of advantage if the turn-safe connections on the shaft, which is externally driven, are also displaced with respect to the common center.

This arrangement permits a better distribution of power along the shaft and the transfer of very large powers from one shaft to another, especially for the driving of twin screw extruders; it assures satisfactory endurance and security of operation.

Figure 2:
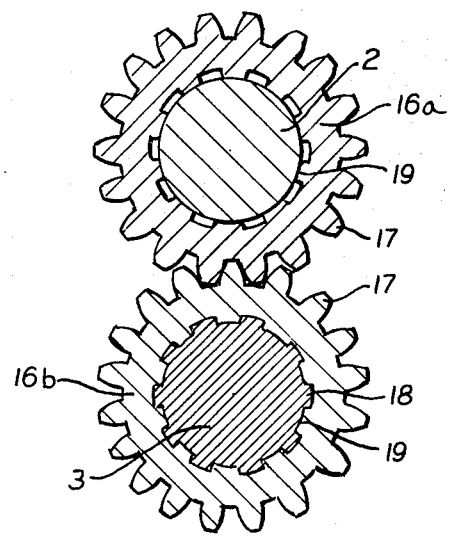

These and other embodiments and objects of the invention will be more fully apparent from the drawings annexed hereto, in which FIGS. 1 and 2, both in cross-section, represent in elevation and side view, respectively, the invention in its several aspects, without, however, being limited thereto.

In the cross-walls 1 of a gear housing, there are arranged parallel to each other two shafts, 2 and 3, each mounted in three bearings, 4 to 9, and driving directly the extruder screws 10 and 12 axially coupled with them. Shaft 3 is driven at its free end, for example, by an electromotor, by connecting the toothed shaft piece 13, with the toothed coupling tube 14, of a motor drive.

The gear mechanism is formed by two pairs of driving gears, 16a, 16b, 16c, 16d. Each driving gear, 16a, 16b, 16c and 16d, respectively, has a relatively small pitch circle diameter, with width of teeth 17 being relatively large, or, more generally, the pitch circle diameter being substantially not larger than of the order of magnitude of the tooth width. The inner bore of gear 16a, b, c and d is also provided with inner teeth extending axially through the entire length of the bore, as it is being indicated at 19, to permit a particularly effective connection or interlock, secure against rotation (turn-safe), with shafts 2 and 3, respectively, on which the driving gears are mounted.

Coupled with the inner bore of the driving gears is a shaft piece 18, having a wedge-type tooth arrangement corresponding to the tooth arrangement 19 on the inner bore of gears 16a, b, c and d. The connection between driving gears and shafts is effected by sliding the driving gear with its inner teeth 19 over shaft piece 18, which, according to a specific embodiment of the invention, is only so wide that this specific turn-safe interlock will exist merely over a portion of the tooth width of the driving gear. In a further embodiment of the invention, this interlock, as exemplified in FIG. 1, is arranged mirror-symmetrically displaced with respect to the common center of the gear pair 16a, b, and c, d respectively. In addition, the interlock of gear pair 16a, c, and 16b, d may be displaced with respect to the common center on the shaft associated therewith in such a manner that the interlock connections arranged on the externally driven shaft 3, as indicated at 16b and 16d, are arranged displaced toward the common center located on their common shaft 3.

While the invention has been shown and described in connection with certain gears, gear connections and coupling elements and coupling procedures, it is not limited thereto nor to the number or the specific arrangements of such elements, but may be applied in any appropriate connection or manner without departing from the scope of this disclosure.

We claim:

1. In a driving arrangement for extruder screws, a motor driven shaft, at least another shaft arranged parallel to said shaft, and extruder screws connected to said shafts for working against each other; a plurality of gear means arranged on each of said shafts, separately, one next to the other, the plurality of gear means on one shaft meshing with those on the other shaft so as to drive the shafts in opposite directions while distributing the power over said plurality of gear means; and interlocking means for coupling the outer surfaces of the shafts with the inner surfaces of at least one pair of gear means meshing with each other; the interlocking means for each of said gear means extending over portions of said shafts which are substantially smaller than the corresponding effective width of the gear means, the interlocking means for one gear on one of said shafts being axially displaced with respect to the interlocking means of its mating gear on said other shaft.

2. Arrangement according to claim 1, wherein said interlocking means for couples the outer surfaces of the shafts with the inner surfaces of at least two pairs of gears means, the gears of each pair meshing with each other; the interlocking means for each of said gear means extending over portions of said shafts which are substantially smaller than the corresponding effective width of the gear means; the interlocking means for the gear means of one pair being axially displaced with respect to each other; and the interlocking means for the gear means of the other pair being axially so displaced with respect to each other so as to form a mirror-reflected image of the interlocking means of the first pair with respect to a common center arranged in the middle between said pairs of gear means.

3. Arrangement according to claim 2, wherein said gear means is additionally seated directly on said shafts at least at its ends.

4. Arrangement according to claim 2, wherein said plurality of gear means comprises at least two separately mounted gears having teeth meshing with corresponding teeth of the gears on the other of said shafts, whereby the power transfer between the shafts driving the extruder screws occurs at least through said helical teeth driving gears, said helical teeth driving gears comprising at least said one meshing pair.

5. Arrangement according to claim 1, wherein said plurality of gear means comprises at least two separately mounted gears having teeth meshing with corresponding teeth of the gears on the other of said shafts, whereby the power transfer between the shafts driving the extruder·screws occurs at least through said helical teeth driving gears, said helical teeth driving gears comprising at least said one meshing pair.

6. Arrangement according to claim 1, wherein said gear means is additionally seated directly on said shafts at least at its ends.

7. In a driving arrangement, a pair of gears meshing with each other, each having a tooth width at least of the order of the magnitude of the pitch circle diameter, a pair of shafts supporting said gears and connected thereto, secure against turning through interlocks extending over merely a surface which is small as compared with the tooth width, at least the ends of each gear being also seated directly on the shaft, said interlocks being axially displaced on opposite sides of a common center line perpendicular to the shaft of said gear pair.

8. In a driving arrangement for extruder screws, a motor driven shaft, at least another shaft arranged parallel to said shaft, and extruder screws connected to said shafts for working against each other; at least four gear means arranged on said shafts, separately, one next to the other, two of said four gear means on one shaft meshing with those on the other shaft so as to drive the shafts in opposite directions while distributing the power over said four gear means; interlocking means for coupling the outer surface of said shafts with the inner surface of said four gear means; the interlocking means for at least one of said gear means and for the gear means meshing with said one gear means extending over portions of said shafts which are substantially smaller than the corresponding effective width of said gear means; the remaining inner surface of said two gear means being supported at least on its ends directly on the outer surface of said shafts; the interlocking means on one of said shafts being axially displaced with respect to the interlocking means on said other shaft.

* * * * *